Feb. 25, 1930.  F. PRANTL  1,748,078
ELECTRIC RAILWAY DRIVE
Filed Aug. 13, 1927  2 Sheets-Sheet 1
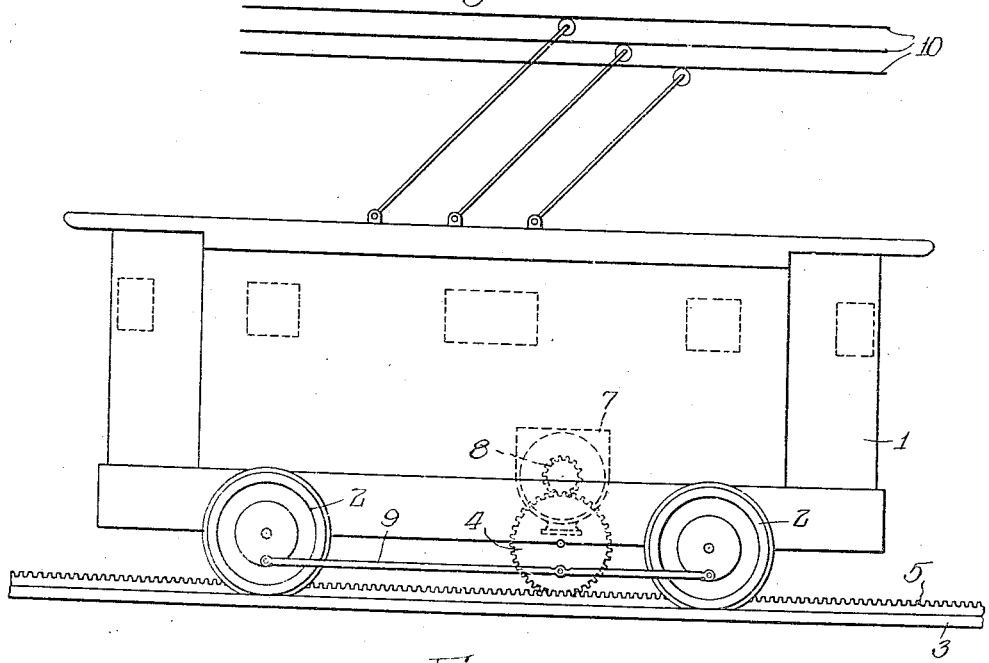
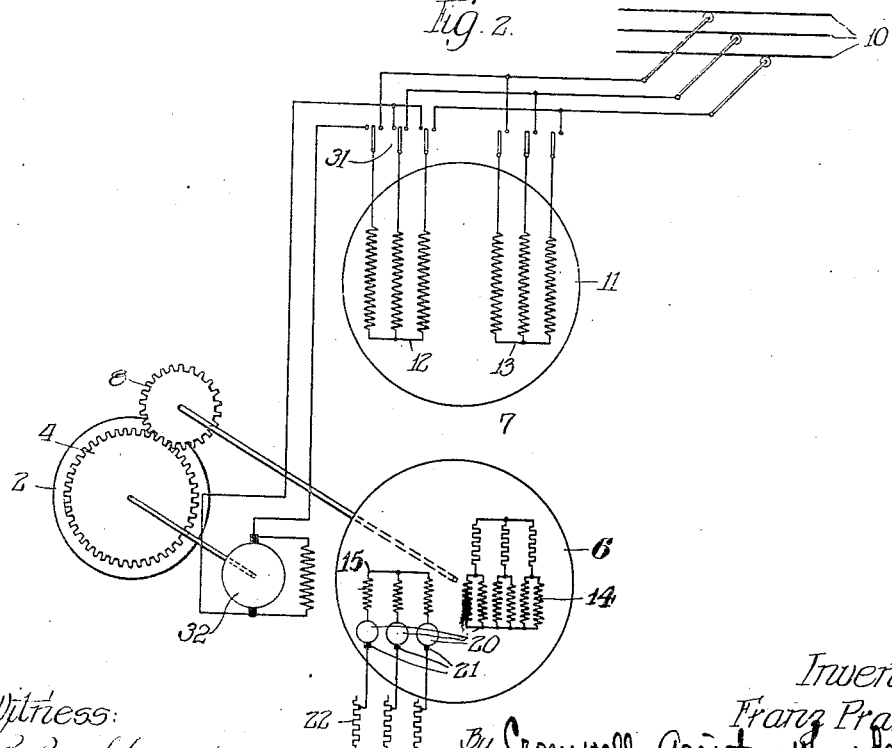

Feb. 25, 1930. F. PRANTL 1,748,078
ELECTRIC RAILWAY DRIVE
Filed Aug. 13, 1927 2 Sheets-Sheet 2
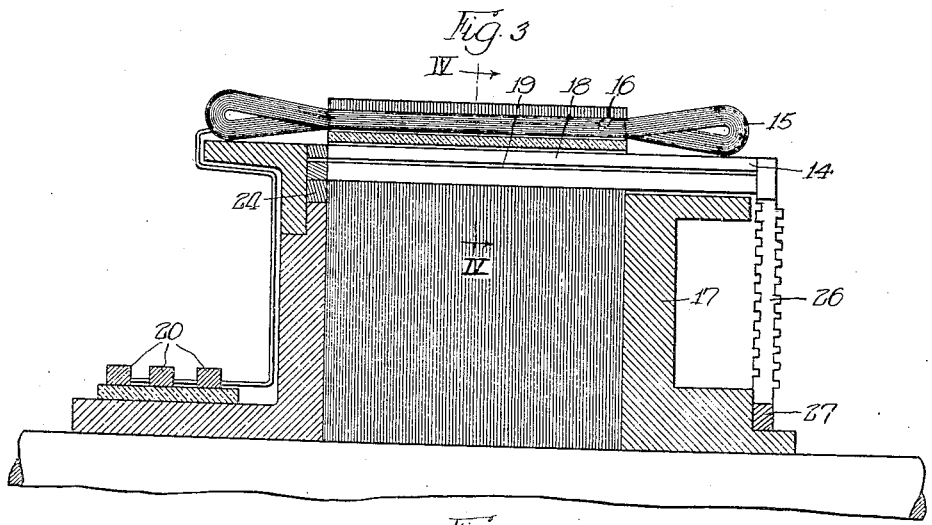
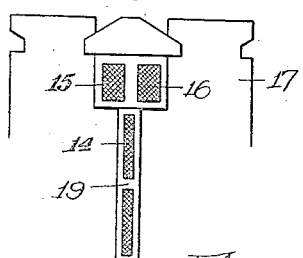
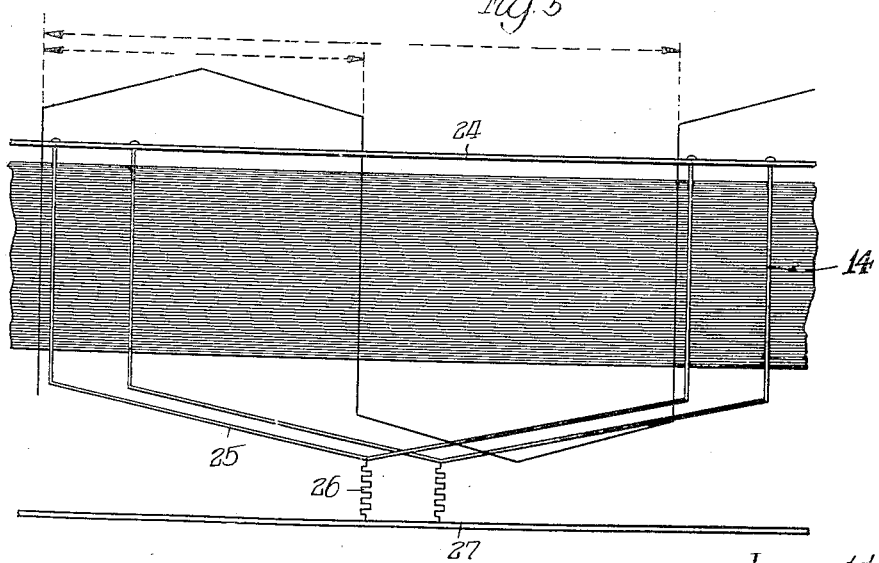

Patented Feb. 25, 1930

1,748,078

UNITED STATES PATENT OFFICE

FRANZ PRANZL, OF WETTINGEN, SWITZERLAND, ASSIGNOR TO A. G. BROWN BOVERI & CIE, OF BADEN, SWITZERLAND, A JOINT-STOCK COMPANY OF SWITZERLAND

ELECTRIC RAILWAY DRIVE

Application filed August 13, 1927, Serial No. 212,744, and in Germany August 18, 1926.

This invention relates to electric railway drives and it has particular relation to drives for mountain locomotives and like vehicles, utilizing combined adhesion and rack drives, although in some aspects the invention is not limited thereto.

In certain types of locomotives of the foregoing character, the vehicle is driven by induction motors wound to operate on two different pole numbers. The motors are operated with a low pole number on the level stretches of the road, and with a large pole number on the steep stretches of the road. On account of the great amount of energy required to brake such locomotives or trains in descending the steep grades, the trains are braked electro-dynamically by operating the motors as asynchronous generators returning current to the supply line.

Difficulties have been encountered in the application of such railway drives to mountain railways which ascend to high altitudes because very often the current supply would fail at the top of the mountain. In such cases, the locomotive and the train would be stranded without being able to descend because, in the absence of a supply voltage on the trolley line feeding the locomotive, it is impossible to obtain the braking action required for controlling the descent of the vehicle.

According to the invention, difficulties of the foregoing nature are overcome by providing a special motor drive arranged to permit efficient braking action at low descending speeds independently of the presence of the supply voltage on the trolley line feeding the vehicle. To this end, the induction motor has one of its windings arranged to be excited from an auxiliary exciter operated by the descending vehicle, for thereby generating current in the cooperating windings of the other member of the motor, said current being supplied to suitable braking resistors. The various windings of the motor are so arranged as to secure high efficiency, both during driving, as well as during braking operations.

The foregoing, and other objects of the invention, will be best understood from the following description of exemplification thereof, reference being had to the accompanying drawings wherein Fig. 1 is an elevational view of an electric locomotive embodying the invention.

Fig. 2 is a simplified circuit diagram of the electric drive of the locomotive in Fig. 1.

Fig. 3 is a longitudinal section through the secondary member or rotor of a motor used to drive the vehicle.

Fig. 4 is a transverse sectional view along the line IV—IV of Fig. 3 showing a portion of the armature laminations with the windings in the slots thereof, and Fig. 5 is a developed view of the periphery of the armature in Fig. 3.

Electric locomotives for mountainous railways utilizing an adhesion drive on the level road stretches and a rack drive on the steep stretches, very often employ driving motors of the induction type that are arranged for two-speed operation. The motors are arranged to operate with a large pole number, and a relatively low speed so as to give a high tractive effort, on the steep grades, when operating on the rack drive, the speed varying between 8 and 14 kilometers per hour. For operation on the level with an adhesion drive, a speed of 16 to 30 kilometers is obtained by operating the motors with a smaller pole number. In the usual constructions, the motors are arranged with a pole-number ratio of 1 to 2. In the practical operation of such railways, difficulties have been experienced because of the usual large braking energy that has to be disposed of during the descent of the locomotive or train. Under ordinary conditions, regenerative braking is relied upon, the motors being connected for the larger pole number and operating as asynchronous generators, thereby returning energy to the line.

However, in the mountainous regions where such railways operate, the relatively isolated supply lines often become defective and the supply line may remain without voltage for a considerable period of time. In such cases the train may be stranded on a high, isolated portion of the track, it being impossible to descend because of the absence of means for braking the locomotive and the impossibility of regenerative braking in the absence of voltage on the line.

According to the invention, the foregoing difficulties with prior-art induction motor drives of such locomotives are avoided by arranging the rotor or secondary winding of the motor so that, when operating with a large number of poles, it is possible to brake the locomotive electro-dynamically independent of the voltage in the supply line or trolley wire. In the preferred arrangement, the second small pole number rotor winding is constructed in the form of a squirrel-cage winding having relatively low resistance for operation with the small pole number and having special connections for providing a relatively high resistance current path for currents induced by a flux of the higher pole number. In this way it is possible to utilize, to a certain extent, the small pole number winding to exercise auxiliary braking action at the low pole number operation.

Referring to the drawings, a locomotive 1 intended to be operated over level and graded road sections, is provided with wheels 2 cooperating with rails 3 for driving said locomotive by adhesion and with a gear 4 cooperating with a rack 5 for propelling the locomotive over the steep grades of the road. The wheels and gear are arranged to be driven from a motor 7 through suitable intermediary driving mechanisms, as for instance, pinion 8 and drive rod 9. Ordinarily, the rack will extend only over the steep sections of the road on which the rack drive is to be utilized.

In the preferred arrangement of the locomotive, the driving force is obtained from one or more motors of the induction type that are arranged to be connected with a polyphase supply line 10, shown in the form of trolley wires.

A simplified diagram of the elements of the motor drive and the connections thereof is shown in Fig. 2 of the drawings. The induction motor 7 comprises a stator or primary member 11 cooperating with the concentric rotor or secondary member 6. The stator is provided with windings arranged to operate with a relatively large pole number at the low speeds when driving the locomotive on the grades, and with a small pole number at the relatively high speeds when driving the locomotive over the level portions of the road. This is indicated by the two distinct three-phase star connected windings 12, 13 on the stator, winding 12 being designed for operation with 2 P-poles, and winding 13 being designed to operate with P-poles. The rotor or secondary member 6 of the induction motor has two distinct windings, a P-pole number winding 14 and a 2 P-pole number winding 15, for cooperation with the stator windings.

The construction of the rotor windings 14 and 15 and their arrangement in the slots of the rotor armature is best shown in Figs. 3 to 5 of the drawings. The 2 P-pole number winding 15 is disposed in slots 16 of relatively large width near the periphery of the armature core 17, while the low pole number winding 14 is disposed in relatively deep and narrow slots 19 farther away from the periphery of the armature. In the preferred arrangement as shown in the drawing, the wide slots for the larger pole number winding and the narrow, deep slots for the narrow pole number windings are combined and arranged one below the other. The large pole number winding 15 is of the wound type and is connected to three slip rings 20 arranged to cooperate with brushes 21 leading to a control rheostat 22. The low pole number winding 14 is of the squirrel-cage type and comprises winding loops having a pole pitch twice the size of the polt pitch of the large pole number winding, the loops being short circuited on one side by a short-circuiting-ring 24.

In order to permit utilization of the squirrel-cage winding when operating with the larger pole number, particularly during braking, the loop heads 25 on the side opposite the short circuiting ring 24 have taps to which are connected resistors 26 that are in turn short circuited by a second short circuiting ring 27. The individual loops of the squirrel-cage winding are so arranged that, when the rotor operates with the 2 P-pole number field, the squirrel-cage winding 14 will operate as a winding, circulating currents induced by said 2 P-pole number field through the resistors 26 and the short circuiting rings 24 and 27. Accordingly, the winding will operate both on the low and the large pole number.

A locomotive provided with a motor of the type described above may be electro-dynamically braked in descent from a grade by connecting the motors for the 2-pole number operation and permitting the descending locomotive to drive the rotor 6 at super-synchronous speed so as to return energy to the supply line 10. Full braking action may also be secured in case of the failure of the line voltage, when asynchronous regenerative action is impossible, by connecting the stator winding 12, through a switch 31 to an auxiliary exciter 32 that may be driven by one of the locomotive axles. The rotation of the secondary motor member 6 within the field induced by the currents from the exciter 32 will generate in the windings 14 and also in windings 15, currents that will electro-dynamically brake the locomotive. It will thus be possible to descend from the grade independently of the conditions of the supply line and without necessitating the provision of expensive mechanical braking equipment as would otherwise be required.

For the satisfactory operation of drives of the foregoing character, it is important that the secondary winding 15 of the larger pole number that is principally active during the braking period shall be preferred in the design over the low pole number winding and it is for this reason that the large pole number winding is placed near the periphery so as to have low leakage. Since the braking current that the winding is required to carry may be very large, the mounting near the periphery will also help in dissipating the heat losses in said winding.

The employment of induction motors of the type described above greatly improves the operation of rack locomotives of the above described character and makes the same more independent of breakdowns and temporary interruptions in the supply when descending grades than in the prior art drives known heretofore. Many modifications of the invention as described above will suggest themselves to those skilled in the art and it is accordingly desired that the appended claims be given a construction commensurate with the scope of the invention.

I claim:

1. In an electrically propelled vehicle, a driving motor of the induction type comprising a primary member, a secondary member, winding connections on said primary member for operation with a relatively large pole number at low speed and with a relatively low pole number at high speeds, a slip-ring winding on said secondary member for operation on the large pole number, and a winding consisting of short-circuiting loop coils on said secondary member for operation with said low pole number, said secondary large pole number winding having relatively less leakage reactance than said low pole number winding.

2. In an electrically propelled locomotive, a driving motor of the induction type comprising a primary member and a secondary member, winding connections on said primary member for operating the same either with a large pole number or with a small pole number, said secondary member comprising an armature having a set of relatively wide slots near the periphery of the armature and a set of relatively deeper slots, a large pole number secondary winding disposed in the relatively wide slots for cooperating with the large pole number winding connections of said primary member, and a small pole number winding in said deep slots for cooperating with said small pole number winding connections of said primary member.

3. In an electrically propelled locomotive, a driving motor of the induction type comprising a primary member and a secondary member, winding connections on said primary member for operating the same either with a large pole number or with a small pole number, said secondary member comprising an armature having a set of relatively wide slots near the periphery of the armature and a set of relatively deeper slots, a large pole number secondary winding disposed in the relatively wide slots for cooperating with the large pole number winding connections of said primary member, and a small pole number winding in said deep slots for cooperating with said small pole number winding connections of said primary member, said secondary large pole number winding being of the slip-ring type, and said secondary small pole winding consisting of short-circuiting loop coils.

4. In an electrically propelled locomotive, a driving motor of the induction type comprising a primary member and a secondary member, winding connections on said primary member for operating the same either with a large pole number or with a small pole number, said secondary member comprising an armature having a set of relatively wide slots near the periphery of the armature and a set of relatively deeper slots, a large pole number secondary winding disposed in the relatively wide slots for cooperating with the large pole number winding connections of said primary member, and a small pole number winding in said deep slots for cooperating with said small pole number winding connections of said primary member, said secondary large pole number winding being of the slip-ring type, and said secondary small pole number winding being of the squirrel-cage type, means for operating said motor with either said low pole number windings or said large pole number windings for driving and for regeneratively braking said locomotive under asynchronous operation, and means for independently exciting said primary large pole number winding connections to electro-dynamically brake said locomotive by inducing currents in said secondary large pole number windings.

In testimony whereof I have hereunto subscribed my name this 1st day of July A. D. 1927, at Zurich, Switzerland.

FRANZ PRANTL.